E. G. DODGE.
PROCESS OF MAKING BATTERY PLATES.
APPLICATION FILED NOV. 4, 1911.
1,045,822.
Patented Dec. 3, 1912.
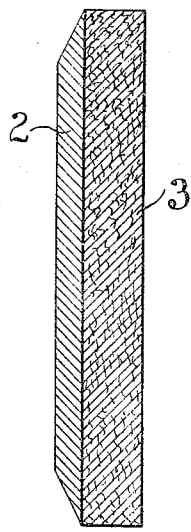
WITNESSES:
INVENTOR
EBEN·G·DODGE
BY
ATTORNEYS

UNITED STATES PATENT OFFICE.

EBEN G. DODGE, OF SOUTH ORANGE, NEW JERSEY.

PROCESS OF MAKING BATTERY-PLATES.

1,045,822.

Specification of Letters Patent. Patented Dec. 3, 1912.

Application filed November 4, 1911. Serial No. 658,466.

*To all whom it may concern:*

Be it known that I, EBEN G. DODGE, a citizen of the United States, and a resident of South Orange, in the county of Essex and State of New Jersey, have invented certain new and useful Improvements in a Process of Making Battery-Plates, of which the following is a specification.

My invention relates to the method of manufacturing battery plates comprising some metallic depolarizing material like copper oxid and a backing or support therefor fused together.

Briefly stated, my invention consists in compressing a plastic mass of the depolarizing substance upon a backing of a suitable character for permitting the parts to be united by fusion, by which compression the plastic mass is not only partially solidified but is also caused to make close and intimate union with the surface of the backing, and thereafter firing the backing and the compressed mass of depolarizing material at a suitable temperature to harden or agglomerate the depolarizing substance and at the same time produce a union between it and its backing by fusion.

My invention is particularly applicable to the manufacture of battery plates or elements composed essentially of copper oxid, as in the well-known copper oxid battery having a zinc or positive element and a copper oxid negative element.

A battery element of the construction herein described is claimed in my prior application filed July 1st, 1907, No. 381,591, and my present application is designed to cover the process or method of manufacture of the same.

In the accompanying drawings, the figure is a vertical transverse section through a battery plate or element, to the manufacture of which my present invention is applicable.

In this drawing the mass of copper oxid or other metallic compound is indicated at 2, while its support plate is indicated at 3.

Obviously, the invention would be likewise applicable to constructing a battery plate or element having copper oxid on both surfaces of the support plate 3. The backing or support plate may be composed of finely divided material consolidated into a hard mass, as herein described, or may be a solid material.

I will describe my invention as applied to manufacturing a battery element in which the backing is composed of finely divided material ground to the desired degree of fineness or otherwise divided and made up into a plastic mass and compressed into a solid plate.

My present invention is especially useful in constructing the element when made from copper or other oxid so backed because the compression of a plastic mass of the copper oxid and of the mass of plastic material forming its backing may be done in one operation. The operation, however, would be essentially the same in case a backing of solid material is employed and as will be readily understood from the subjoined description.

Whatever the form of backing employed, the operation more generally stated, would be conducted as follows: The backing being placed in a suitable mold or form, the plastic mass of the copper or other oxid rendered plastic by mixing with a suitable liquid, is spread to the desired thickness over the backing and compressed thereon, thereby bringing it into intimate contact with the surface of the backing, after which the backing and the applied layer of oxid are together fired at a suitable temperature, such as usually employed in the art for consolidating or hardening copper oxid plates, thereby fusing the copper oxid mass and at the same time forming an intimate fused union between the same and the backing, which is itself of proper character to lend itself to the union of backing and superposed layer by the firing process.

Assuming that the support plate 3 is made of some ground or finely divided material molded and compacted by pressure, as for instance of an earthy material or pumice, the procedure is as follows: The material constituting the backing is made up into a plastic mass by mixing the same with a solution of caustic soda or other suitable flux and is spread in a layer of the desired thickness in a mold. Over this the layer of copper oxid made into a plastic mass in the usual or any proper manner is spread. Preferably, in making such plastic mass I employ the usual solution of caustic soda but do not limit myself to the use of any particular solution. This plastic mass is spread over the earthy material in the mold and the two layers are then compressed in a hydraulic press to compact them in the same way heretofore adopted for making the plate composed wholly of copper oxid. The plate thus constructed is then fired at a temperature of one thousand degrees Fahrenheit more or less or such temperature as would be usually employed in making compressed and solidified plates composed wholly of copper oxid. The result is an intimate union or coalescence of the oxid and the backing which can be best described as a fusion of the surfaces of the two layers together, such fusion being due probably to the presence of the flux in the material of the backing plate and in the layer of the copper oxid or in either or both. The same operation of firing obviously also results in the usual solidification or hardening of the copper oxid itself such as is brought about in previous practice when the plate is composed wholly of copper oxid. Owing to this semi-fusion or union of the opposed surfaces of the mass of copper oxid together with the solidification and hardening of the copper oxid itself, there is little liability to disintegration or detachment of the copper oxid portion of the plate from its support, pdate or backing and which will therefore give very long service at small initial cost.

Obviously, my invention is applicable to the construction of battery elements in which the backing plate is composed of other substances mixed with a fluxing material like caustic soda; also it may be applied to the construction of battery elements in which the backing is other than a flat plate or backing or is imperforate.

In place of the solution of caustic soda as a flux or binder, any other flux such as is used in pottery work might be employed in making up the backing when composed of a mass of finely divided earthy material. For this portion of the compound plate ground pumice may be employed as set forth in my prior application filed July 1st, 1907, Serial No. 381,591.

What I claim as my invention is:

1. The herein described method of manufacturing battery plates comprising a mass of metallic oxid and a backing consisting in applying a plastic mass of said oxid upon the backing and then firing the two at a temperature sufficiently high to fuse the oxid and unite it by its meeting surface to said backing, while at the same time consolidating or hardening the oxid.

2. The herein described method of manufacturing a battery element comprising copper oxid and a backing consisting in applying a mass of the copper oxid upon the backing and then firing to harden the oxid and at the same time unite it with the base by a fusion of the meeting surface of both.

3. The herein described method of manufacturing a battery element comprising a mass of metallic oxid and a backing composed of a mass of compressed finely divided earthy material consisting in compressing a plastic mass of the oxid upon a plastic mass of the earthy material and then firing to consolidate the oxid and unite the same to the backing.

4. The herein described method of manufacturing a battery element comprising copper oxid and a backing of earthy material consisting in forming the earthy material into a plastic mass with a suitable flux, compressing a mass of the copper oxid made plastic upon the mass of earthy material and then firing at a temperature suitable for solidifying the copper oxid.

Signed at New York in the county of New York and State of New York this 3rd day of November, A. D. 1911.

EBEN G. DODGE.

Witnesses:
F. B. TOWNSEND,
M. A. PORTER.

---

Copies of this patent may be obtained for five cents each, by addressing the "Commissioner of Patents, Washington, D. C."